United States Patent
Homma

(10) Patent No.: US 11,912,315 B2
(45) Date of Patent: Feb. 27, 2024

(54) AIR CONDITIONING SYSTEM FOR A ROOM WITH A SEAT, AND METHOD FOR AIR CONDITIONING A ROOM WITH A SEAT

(71) Applicant: Mitsubishi Electric Corporation, Tokyo (JP)

(72) Inventor: Naohiko Homma, Livingston (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 108 days.

(21) Appl. No.: 17/412,253

(22) Filed: Aug. 26, 2021

(65) Prior Publication Data
US 2022/0065467 A1 Mar. 3, 2022

(30) Foreign Application Priority Data
Aug. 31, 2020 (EP) ...................................... 20193622

(51) Int. Cl.
*B61D 27/00* (2006.01)
(52) U.S. Cl.
CPC ............................... *B61D 27/0018* (2013.01)
(58) Field of Classification Search
CPC .................... B61D 27/0018; B60H 1/00371
See application file for complete search history.

(56) References Cited

U.S. PATENT DOCUMENTS

| | | | | |
|---|---|---|---|---|
| 1,778,080 A | * | 10/1930 | Kruckenberg | ............ B61B 3/02 454/103 |
| 2,147,906 A | * | 2/1939 | Lintern | .............. B60H 1/00371 454/75 |
| 3,237,545 A | * | 3/1966 | Gillick | ...................... F24D 5/00 62/239 |
| 3,862,549 A | * | 1/1975 | Fernandes | .......... B61D 27/0018 165/42 |

(Continued)

FOREIGN PATENT DOCUMENTS

| | | |
|---|---|---|
| CN | 105946884 B | 10/2018 |
| GB | 1389375 A | 4/1975 |
| JP | 10-109644 A | 4/1998 |

(Continued)

OTHER PUBLICATIONS

Russian Office Action dated Mar. 15, 2022, issued in corresponding Russian patent application No. 2021124196.

(Continued)

*Primary Examiner* — Christopher R Zerphey
(74) *Attorney, Agent, or Firm* — XSENSUS LLP

(57) ABSTRACT

Air conditioning system is at least partially located in a room comprising at least one seat. The system comprises at least one main supply air inlet opening into the room and arranged at a height of ≤0.3 m above a floor of the room, or on the floor, at least one air outlet opening into the room and arranged at a height of <0.3 m below a ceiling of the room, or in the ceiling, and at least one assisting supply air inlet opening into the room and arranged at a height between first (Continued)

and second points of the seat. The first point is the point of the seat having the largest distance to the floor of the room in a direction perpendicular to the floor. The second point is the point of the armrest of the seat having the largest distance to the floor in the direction.

20 Claims, 3 Drawing Sheets

(56) References Cited

U.S. PATENT DOCUMENTS

| | | | | |
|---|---|---|---|---|
| 4,935,599 A | * | 6/1990 | Babin | B61D 27/0018 |
| | | | | 219/202 |
| 5,351,884 A | * | 10/1994 | Kadotani | B60H 1/247 |
| | | | | 237/12.3 A |

FOREIGN PATENT DOCUMENTS

| | | |
|---|---|---|
| JP | 2008-213790 A | 9/2008 |
| RU | 2375222 C1 | 12/2009 |

OTHER PUBLICATIONS

Office Action dated Apr. 13, 2023, in corresponding Chinese patent Application No. 202110972074.1, 14 pages.
Office Action dated Oct. 11, 2023, in corresponding Chinese patent Application No. 202110972074.1, 18 pages.
Guo Damin et al., "Car configuration and performance", Automobile Performance and Layout, Beijing University of Technology Press, Jun. 2016, 1st edition, pp. 94-96, total 13 pages.

\* cited by examiner

AIR CONDITIONING SYSTEM FOR A ROOM WITH A SEAT, AND METHOD FOR AIR CONDITIONING A ROOM WITH A SEAT

CROSS-REFERENCE TO RELATED APPLICATION

This application is based upon and claims the benefit of priority of the prior European Patent Application No. 20193622.6, filed on Aug. 31, 2020, the entire contents of which are incorporated herein by reference.

DESCRIPTION

An air conditioning system is provided which is at least partially located in a room which is to be conditioned and which comprises at least one seat. The air conditioning apparatus comprises at least one main supply air inlet which opens into the room and is arranged at a height of ≤0.3 m above a floor of the room (or on a floor of the room), at least one air outlet which opens into the room and is arranged at a height of <0.3 m below a ceiling of the room (or in a ceiling of the room) and at least one assisting supply air inlet which opens into the room and is arranged at a height between a first point of the seat defined by the highest point of the seat in the room and a second point of the seat defined by the highest point of the armrest of the seat in the room. The system allows to decrease the vertical temperature difference along the seat in the room to be cooled, thereby improving the conditioned air comfort of a person sitting in the seat of the room. A method for air conditioning a room which has these advantages is also presented.

Conventionally, an air conditioner for a passenger railway vehicle is installed above the ceiling of carriage. Conditioned air is provided from the ceiling and then returned to the suction outlet located at another portion of the ceiling. However, especially in the cooling operation, the problem exists that cold air supplied from an inlet above the passenger comes across (or strikes) existing warmed air and results in slightly increasing the temperature of conditioned air. Moreover, due to the return air outlet being located on the ceiling, conditioned air is unintentionally returned to the outlet. This airflow behavior brings about the problem that conditioned air doesn't sufficiently reach the wide range of the whole carriage.

Therefore, in order to supply the conditioned airflow as far as possible, a measure to overcome this problem is that the velocity of the flow of cold air from the inlet is increased. However, this measure causes further problems. Firstly, energy consumption is high. Secondly, this measure is connected to the generation of an uncomfortable noise and draught air around the head region of persons (passengers) in the carriage room of a train.

In order to solve this problem, it is known install the air conditioner under the floor of the room to supply air from the floor level and to install the return-air outlet on the ceiling (see e.g. (JP 2008 213790 A). This air conditioning system allows reduction of noise, energy loss and uncomfortable draught air if the airflow velocity is set low enough.

However, these air conditioning systems still have a significant problem regarding the cooling operation. Typically, supplying airflow from the floor results in linear temperature distribution with a minimum temperature in the leg region and a maximum temperature in the head region of a person in said carriage room. Furthermore, the temperature difference between the leg region and the head region tends to be significantly large. Besides, the temperature around leg region tends to be colder than the average temperature of the carriage. Both the large temperature difference from the floor to the ceiling and the colder environment around the leg region of a person in the carriage room decrease the comfort level for said person (passenger). This is true even if the level of vertical temperature difference is satisfactory in regard with the regulation such as EN14750 European Standard.

U.S. Pat. No. 5,351,884 A discloses a cabin heating apparatus having a central duct extended to the side of the operator's seat through a front-to-rear changeover damper connected to an air conditioner unit, a rear duct extended to the rear of the operator's seat through the front-to-rear changeover damper and outlets formed at the extreme end part of the rear duct, wherein the heating apparatus is further provided with a lower outlet for supplying an air flow along the floor through an above-to-below changeover damper connected to the extreme end part of the central duct, a front duct rising from the above-to-below changeover damper and a front outlet provided at the extreme end part of the front duct.

GB 1 389 375 A discloses an air-conditioning system which allows to ensure a sufficiently warm floor zone, because during both the heating and cooling stages, the temperature of the supplementary conditioning air emerging from below the seats is above the temperature of the main conditioning air.

Starting from this prior art, it was the object of the present application to provide an air conditioning system and a method for air conditioning a room which comprises at least one seat which does not suffer the disadvantages of the prior art. Specifically, the vertical temperature difference in the room to be cooled should be decreased. In other words, the comfort of the person in the room (e.g. a passenger of a train in a train carriage room) should be improved. In a specific embodiment, it should be possible that the cold environment around the leg region of the seat in the room should be avoided.

The object is solved by the air conditioning system according to claim 1 and the method according to claim 14. The dependent claims illustrate advantageous embodiments of the invention.

According to the invention, an air conditioning system being at least partially located in a room which is to be conditioned and which comprises at least one seat is provided, wherein the air conditioning system comprises at least one main supply air inlet which opens into the room and is arranged at a height of ≤0.3 m above a floor of the room, or on a floor of the room, at least one air outlet which opens into the room and is arranged at a height of <0.3 m below a ceiling of the room, or in a ceiling of the room, and at least one assisting supply air inlet which opens into the room and is arranged at a height between a first point of the seat and a second point of the seat, wherein the first point of the seat is the point of the seat which has the largest distance to the floor of the room in a direction perpendicular to the floor of the room and wherein the second point of the seat is the point of the armrest of the seat which has the largest distance to the floor of the room in a direction perpendicular to the floor of the room.

The presence of the at least one assisting supply air inlet allows to drastically suppress the vertical temperature distribution which is observed in prior art air conditioning systems. In fact, the presence of the at least one assisting supply air inlet allows to achieve a more homogeneous temperature distribution in a lower region of the room, especially of up to 0.6 m above the floor of the room.

Typically, a residential space in a carriage space of a train is up to 1.2 m above the floor, especially in case of high speed railway trains. Considering the temperature difference for residential space, the vertical temperature difference normally observed in prior art air conditioning systems in this context is decreased by more than 30%.

In the air conditioning system, the height between the first point of the seat and the second point of the seat can be a height ranging from ≥0.4 m, preferably ≥0.5 m, above a floor of the room, to ≥0.5 m, preferably ≥0.8 m, more preferably ≥1.1 m, below a ceiling of the room. Especially, the height between the first point of the seat and the second point of the seat is a height in the range of 0.5 m to 1.4 m from the floor of the room. The location of the at least one assisting supply air inlet at these heights has turned out to be particularly advantageous for creating a more homogeneous temperature distribution from the feet region to the head region of a person in the room.

The air conditioning system can comprise an air conditioning unit, preferably a heating, ventilation and air conditioning unit (HVAC), which is connected to the at least one main supply air inlet and/or to the at least one assisting supply air inlet, such that conditioned air can be conducted from the air conditioning unit to the respective air inlet(s).

The at least one air outlet can be a return air outlet which is connected to the at least one main supply air inlet and/or to the at least one assisting supply air inlet, via the air conditioning system, such that air can be conducted from the at least one return air outlet to the air conditioning unit and from the air conditioning unit to the respective air inlet(s).

The air conditioning system can further comprise a damper, wherein an inlet of the damper is connected to the at least one air outlet in an air conducting manner, wherein a first outlet of the damper is connected to the at least one main supply air inlet in an air conducting manner and wherein a second outlet of the damper is connected to the at least one assisting supply air inlet in an air conducting manner, wherein the damper is configured to distribute air entering its inlet between its first and second outlet.

Furthermore, the air conditioning system can further comprise at least one fresh air intake which opens to an outside of the room, wherein the fresh air intake is connected to the at least one main supply air inlet and/or to the at least one assisting supply air inlets, preferably via an intake blower, in an air conducting manner.

The at least one air outlet can be an exhaust outlet, wherein the air conditioning system further comprises an exhaust blower which is connected to the at least one exhaust outlet, wherein the exhaust blower is configured to blow air entering the blower from the exhaust outlet to an outside of the room.

The air conditioning system can comprise a plurality of main supply air inlets which open into the room and are arranged at a height of 0.3 m above a floor of the room, or on a floor of the room, wherein a first fraction of said main supply air inlets is arranged at a first side wall of the room and a second fraction of said main supply air inlets is arranged at a second sidewall opposing the first sidewall.

Moreover, the air conditioning system can further comprise a main supply damper, wherein an inlet of the main supply damper is connected to the air conditioning unit and/or to a fresh air intake in an air conducting manner, wherein a first outlet of the main supply damper is connected to at least one of the main supply air inlets of the first fraction and a second outlet of the main supply damper is connected to at least one of the main supply air inlets of the second fraction in an air conducting manner, wherein the main supply damper is configured to regulate an amount of air flowing to at least one of the main supply air inlets of the first fraction and to at least one of the main supply air inlets of the second fraction.

The air conditioning system can comprise a plurality of assisting supply air inlets which open into the room and are arranged at a height between a first point of the seat and a second point of the seat, wherein one fraction of said assisting supply air inlets is arranged at a first side wall of the room and another fraction of said assisting supply air inlets is arranged at a second sidewall of the room opposing the first side wall.

The air conditioning system can further comprise an assisting supply damper, wherein an inlet of the assisting supply damper is connected to the air conditioning unit and/or to a fresh air intake in an air conducting manner, wherein a first outlet of the assisting supply damper is connected to at least one of the assisting supply air inlets of the first fraction and a second outlet of the assisting supply damper is connected to at least one of the assisting supply air inlets of the second fraction in an air conducting manner, wherein the assisting supply damper is configured to regulate an amount of air flowing to at least one of the assisting supply air inlets of the first fraction and to at least one of the assisting supply air inlets of the second fraction.

Besides, the air conditioning system can comprise a controller which is configured to control that the air blown into the room through the at least one assisting supply air inlet has a lower volume flow than the air blown into the room through the at least one main supply air inlet, preferably only 20% to 90%, more preferably only 40 to 80%, even more preferably only 60% to 70%, especially 67%, of the volume flow of the air blown into the room through the at least one main supply air inlet. The decreased volume flow of air through the assisting supply air inlet has the advantage that a person sitting in the seat experiences a higher degree of comfort regarding the air conditioned air.

Furthermore, the controller can be configured to control that the air blown into the room through the at least one main supply air inlet has a higher temperature than the air blown into the room through the at least one assisting supply air inlet, preferably a temperature which is in the range of 1 K to 12 K, more preferably 2 to 10 K, even more preferably 4 to 8, especially 6 K, higher than the air blown into the room through the at least one main supply air inlet. This specific embodiment has the advantage that, although sufficient cooling of a person sitting the seat of the room can be achieved (by the at least one assisting supply air inlet), the leg region of the person sitting in the seat of the room cooled less strongly, so that a cold environment around the leg region of the seat in the room is avoided.

The room of the air conditioning system can be a carriage of a train.

According to the invention, a method for air conditioning a room which comprises at least one seat is provided. In the method, air is blown into the room through at least one main supply air inlet which opens into the room and is arranged at a height of ≤0.3 m above a floor of the room, or on a floor of the room, wherein air is removed from the room through at least one air outlet which opens into the room and is arranged at a distance of <0.3 m below a ceiling of the room, or in a ceiling of the room, and wherein additionally air is blown into the room through at least one assisting supply air inlet which opens into the room and is arranged at a height between a first point of the seat and a second point of the seat, wherein the first point of the seat is the point of the seat which has the largest distance to the floor of the room in a direction perpendicular to the floor of the room and wherein the second point of the seat is the point of the armrest of the seat which has the largest distance to the floor of the room in a direction perpendicular to the floor of the room.

In the method, the air blown into the room through the at least one assisting supply air inlet can have a lower volume flow than the air blown into the room through the at least one main supply air inlet, preferably only 20% to 90%, more preferably only 40 to 80%, even more preferably only 60% to 70%, especially 67%, of the volume flow of the air blown into the room through the at least one main supply air inlet. The decreased volume flow of air through the assisting supply air inlet has the advantage that a person sitting in the seat experiences a higher degree of comfort regarding the air conditioned air. The total amount of air blown into the room through both the at least one assisting supply air inlet and the at least one main supply air inlet can be in the range of 900 to 1500 m³/h, preferably in the range of 1000 to 1400 m³/h, more preferably in the range of 1100 to 1300 m³/h, especially can be 1200 m³/h.

Furthermore, in the method, the air blown into the room through the at least one main supply air inlet can have a higher temperature than the air blown into the room through the at least one assisting supply air inlet, preferably a temperature which is in the range of 1 K to 12 K, more preferably 2 to 10 K, even more preferably 4 to 8, especially 6 K, higher than the air blown into the room through the at least one main supply air inlet. This specific embodiment has the advantage that, although sufficient cooling of a person sitting the seat of the room can be achieved (by the at least one assisting supply air inlet), the leg region of the person sitting in the seat of the room cooled less strongly, so that a cold environment around the leg region of the seat in the room is avoided.

In a preferred embodiment, the method is carried out with an air conditioning system according to the invention.

BRIEF DESCRIPTION OF DRAWINGS

With reference to the following figures and example, the subject according to the invention is intended to be explained in more detail without wishing to restrict said subject to the specific embodiments shown here.

FIGS. 3A and 3B illustrate the result of case #1. In case #1, the controller is configured to reduce the amount of volume flow of air exiting the assisting supply air inlet to 25% of the amount of volume flow of air exiting the main supply air inlet and to increase the temperature of air exiting the main supply air inlet by 2 K compared to the temperature of air exiting the assisting supply air inlet. This effectuates that the temperature around the legs of the person sitting in the seat is increased compared to prior art air conditioning systems, which results in more air conditioning comfort in the leg region of the person. FIGS. 3B and 3C illustrate the result of case #2. In case #2, the controller is configured to reduce the amount of volume flow of air exiting the assisting supply air inlet to 67% of the amount of volume flow of air exiting the main supply air inlet and to increase the temperature of air exiting the main supply air inlet by 6 K compared to the temperature of air exiting the assisting supply air inlet. This effectuates that the temperature around the legs of the person sitting in the seat is even more increased compared to prior art air conditioning systems and also the temperature in the region of the armchair of the seat is increased compared to prior art air conditioning systems, which results in even more air conditioning comfort in the leg region of the person and more comfort in the region of the armchair of the seat. FIG. 3C illustrates case #3. Case #3 is identical to case #2 except that the total air volume exiting the main supply air inlet and the assisting supply air inlet has been increased to 120% compared to cases #1 and #2 and compared to the prior art. This effectuates that besides the more homogeneous temperature distribution from the leg region to the armchair region of the seat in the room, the temperature distribution also becomes more homogeneous in a direction to the ceiling of the room, which improves both the comfort of persons sitting in the seat of the room and of persons standing in the room. At least in the sitting space, the obtained vertical temperature distribution is regarded as almost constant because the sitting space in a typical train carriage room reaches from around 0 m from the floor of the room to about 1.2 m from the floor of the room towards the ceiling of the room.

Example—Configuration of the Controller of the Air Conditioning System

The controller can be configured to control that that the air blown into the room through the at least one assisting supply air inlet has a lower volume flow than the air blown into the room through the at least one main supply air inlet, preferably only 25% to 90%, more preferably only 40 to 80%, even more preferably only 60% to 70%, especially 67%, of the volume flow of the air blown into the room through the at least one main supply air inlet.

Furthermore, the controller can be configured to to control that the air blown into the room through the at least one main supply air inlet has a higher temperature than the air blown into the room through the at least one assisting supply air inlet, preferably a temperature which is in the range of 1 K to 12 K, more preferably 2 to 10 K, even more preferably 4 to 8, especially 6 K, higher than the air blown into the room through the at least one main supply air inlet.

Three cases #1 to #3 regarding the parameters total flow of air, relative flow of air and relative temperature of air exiting the main supply air inlet and the assisting supply air inlet have been evaluated and the vertical temperature from the floor of the room towards the ceiling of the room have been assessed. The configuration of the controller in these three cases are summarized in the following Table.

TABLE

| Case | Total air volume | Volume flow of air of assisting supply air inlet compared to main supply air inlet | Temperature difference of air of main supply air inlet compared to assisting supply air inlet |
|---|---|---|---|
| p.a. | 100% | 100% (identical) | 0 K (identical) |
| #1 | 100% | reduced to 25% | increased by 2 K |
| #2 | 100% | reduced to 67% | increased by 6 K |
| #3 | 120% | reduced to 67% | increased by 6 K | p.a. = prior art; K = Kelvin; 100% of total air volume = 1200 m³/h

Figure 1:
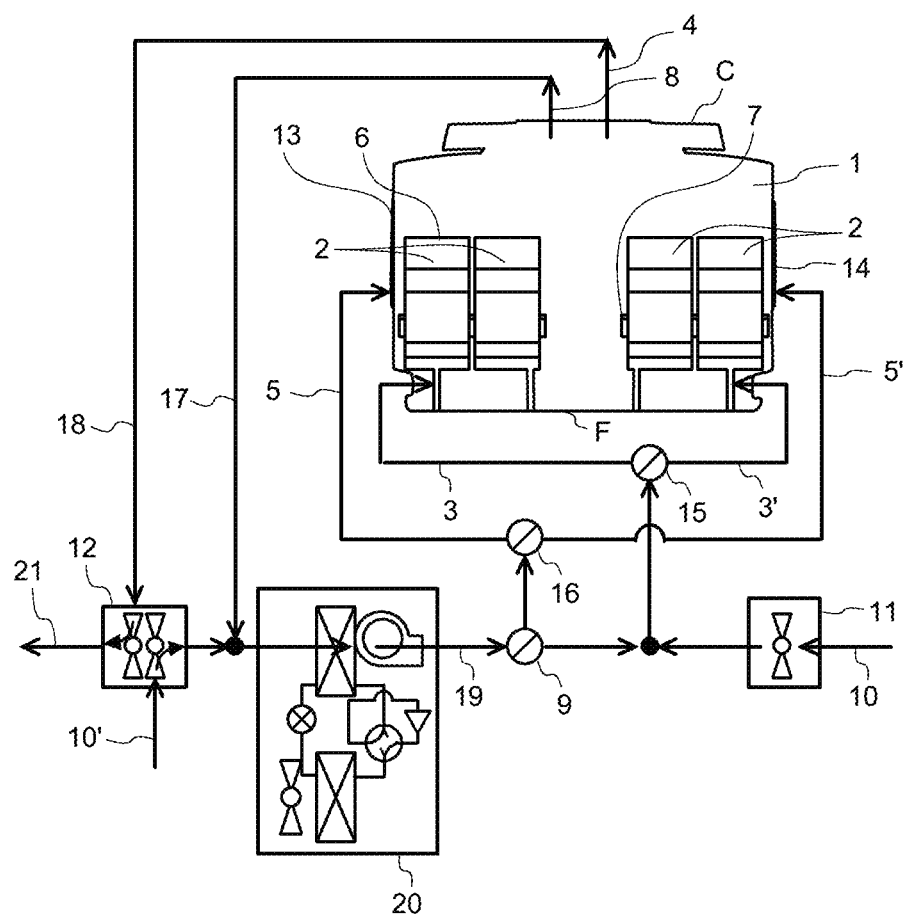
FIG. 1 shows a schematic drawing of an air conditioning system 20 according to the invention which is at least partly located in a room 1 which is to be conditioned and which comprises at least four seats 2. Here, the room 1 is a carriage room of a train. The air conditioning system 20 comprises a main supply air inlet 3 which opens into the room 1 at a first sidewall 13 of the room 1 and a further main supply air inlet 3' which opens into the room 1 at a second sidewall 14 of the room 1. Both main supply air inlets 3, 3' are arranged at a height of ≤0.3 m above a floor F of the room. The air conditioning system 20 further comprises an exhaust outlet 4 which opens into the room 1 and is arranged at a height of 0 m below a ceiling C of the room 1, specifically in a ceiling C of the room 1. Moreover, the air conditioning system 20 comprises an assisting supply air inlet 5 which opens into the room 1 at a first sidewall 13 of the room 1 and a further assisting supply air inlet 5' which opens into the room 1 at a second sidewall 14 of the room 1. Both assisting air supply inlets 5, 5' are arranged at a height between a first point 6 of the at least four seats 2 and a second point 7 of the at least four seats 2, wherein the first point 6 of the at least four seats 2 is the point of the at least four seats 2 which has the largest distance to the floor F of the room 1 in a direction perpendicular to the floor F of the room and wherein the second point 7 of the at least four seats 2 is the point of the armrest of the at least four seats 2 which has the largest distance to the floor F of the room 1 in a direction perpendicular to the floor F of the room. Besides, the air conditioning system 20 further comprises a return air outlet 8 which opens into the room and is arranged at a height of 0 m below a ceiling C of the room 1, specifically in a ceiling C of the room 1. The air conditioning system 20 further comprises a damper 9 which is arranged downstream of the conditioned air 19 exiting the air conditioning unit 20 (here: an HVAC unit). Furthermore, the air conditioning system 20 comprises a fresh air intake 10 having an intake blower 11 and being fluidly connected to the air conditioning unit 20. The air conditioning system 20 also comprises an exhaust blower 12 having a fresh air intake 10' and an exhaust air exit 21, wherein the exhaust blower is fluidly connected to the exhaust outlet 4 via an airduct for exhaust air 18 and is fluidly connected to the air conditioning unit 20. Downstream of the exhaust blower 12 and upstream of the air conditioning apparatus 20, an airduct for return air 17 establishes a fluid connection to the return air outlet 8. The air conditioning apparatus 20 further comprises a main supply damper 15 to regulate the volume flow of air to the main supply air inlets 3,3' and an assisting supply damper 16 to regulate the volume flow of air to the assisting supply air inlets 5, 5'.
Figure 2A:
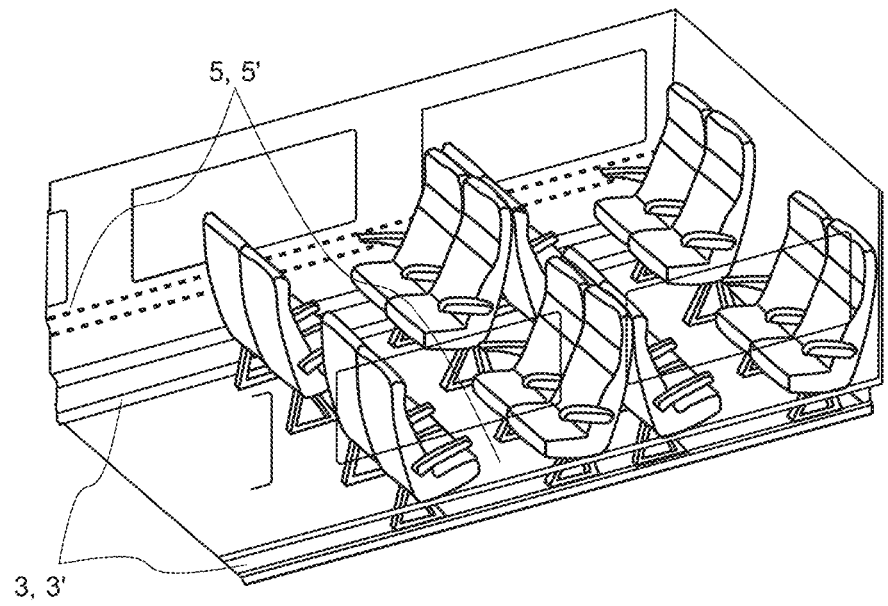
FIG. 2A and FIG. 2B show a further schematic drawing of the flow of air in the room to be conditioned. The flow of air is indicated by arrows in FIG. 2A and FIG. 2B. It can be seen that the air flow from the main supply air inlets 3,3' enters the room at the floor level and that the air flow from the assisting supply air inlets 5,5' enters the room between the armchair of the seats of the room and the uppermost (highest) point of the seats of the room.
Figure 2B:
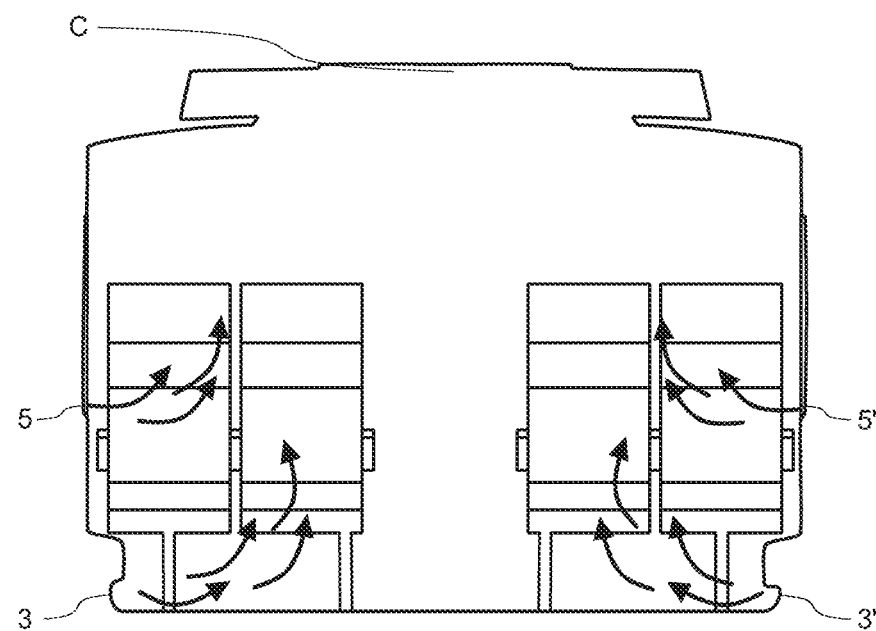
Figure 3A:
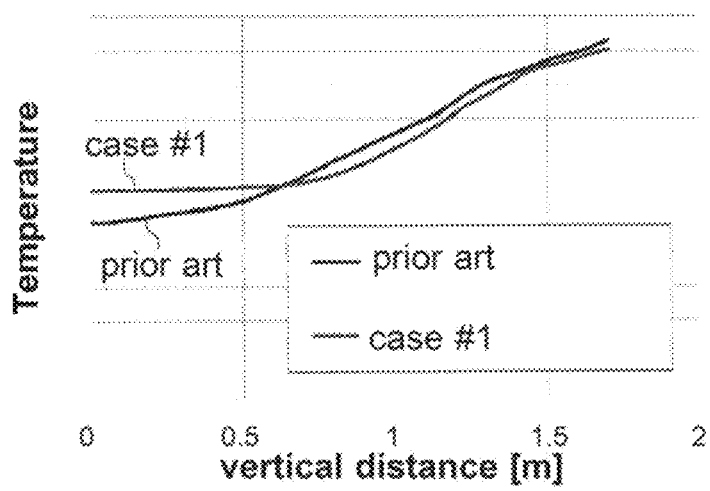
FIG. 3A to 3C show the results for the vertical temperature distribution in the room to be air conditioned regarding three different configurations of the controller (cases #1 to #3; see Example below). The air conditioning system of the prior art brings about a linear temperature distribution from the leg region of the seat in the room towards the ceiling of the room, which causes a discomfort for the person sitting in the seat of the room.
Figure 3B:
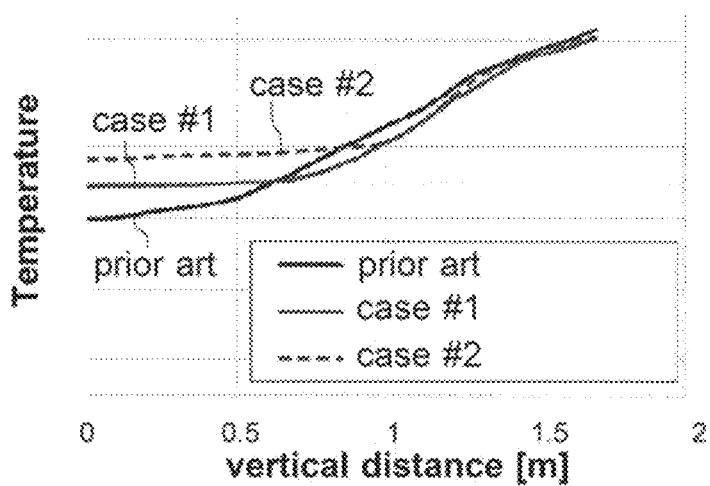
Figure 3C:
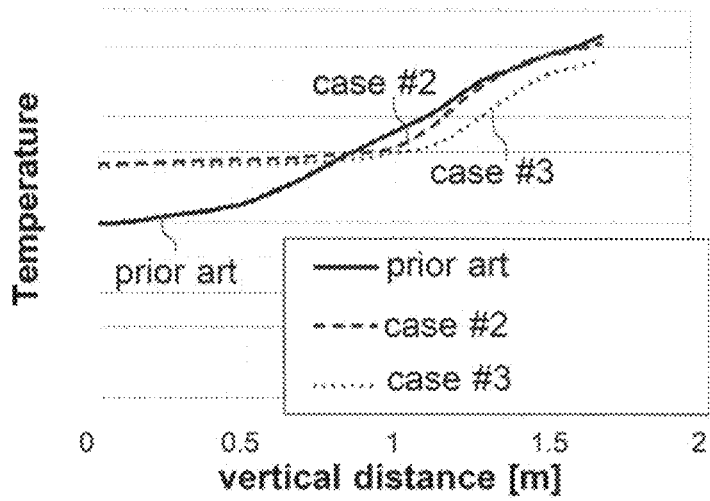

The results regarding the vertical temperature from the floor of the room towards the ceiling of the room for each of the three cases #1 to #3 compared to the prior art are shown in FIG. 3A to 3C. Best results were obtained for cases #2 and #3.

LIST OF REFERENCE SIGNS

1: room which is to be conditioned;
2: at least one seat;
3, 3": at least one main supply air inlet;
4: at least one air outlet (e.g. an exhaust outlet);
5, 5": at least one assisting supply air inlet;
6: first point of the seat;
7: second point of the seat;
8: at least one air outlet (e.g. a return air outlet);
9: damper;
10, 10': at least one fresh air intake;
11: intake blower;
12: exhaust blower;
13: first sidewall of the room;
14: second sidewall of the room;
15: main supply damper;
16: assisting supply damper;
17: airduct for return air;
18: airduct for exhaust air;
19: conditioned air;
20: air conditioning unit (e.g. HVAC);
21: exhaust air exit;
F: floor of the room;
C: ceiling of the room.

The invention claimed is:

1. An air conditioning system being at least partially located in a room which is to be conditioned and which comprises at least one seat, the air conditioning system comprising:
   at least one main supply air inlet which opens into the room and is arranged at a height of ≤0.3 m above a floor of the room, or on a floor of the room,
   at least one air outlet which opens into the room and is arranged at a height of <0.3 m below a ceiling of the room, or in a ceiling of the room, and
   at least one assisting supply air inlet which opens into the room and is arranged at a height between a first point of the seat and a second point of the seat,
   wherein the first point of the seat is the point of the seat has a largest distance to the floor of the room in a direction perpendicular to the floor of the room and the second point of the seat is a point of an armrest of the seat which has a largest distance to the floor of the room in the direction perpendicular to the floor of the room, and
   wherein air temperature and air flow through the at least one main supply air inlet and the at least one assisting supply air inlet are independently controlled.

2. The air conditioning system according to claim 1, wherein a height between the first point of the seat and the second point of the seat is a height ranging from ≥0.4 m above a floor of the room to ≥0.5 m below a ceiling of the room.

3. The air conditioning system according to claim 1, wherein the air conditioning system comprises an air conditioner, including a heating, ventilation and air conditioning system, which is connected to the at least one main supply air inlet and/or to the at least one assisting supply air inlet, such that conditioned air can be conducted from the air conditioner to respective air inlets.

4. The air conditioning system according to claim 3, wherein the at least one outlet is a return air outlet which opens into the room and is arranged at a height of <0.3 m below the ceiling of the room, or in the ceiling of the room, and which is connected to the at least one main supply air inlet and/or to the at least one assisting supply air inlet, via the air conditioning system, such that air can be conducted from the at least one return air outlet to the air conditioner and from the air conditioner to respective air inlets.

5. The air conditioning system according to claim 1, further comprising a damper, wherein an inlet of the damper is connected to the at least one air outlet in an air conducting manner, wherein a first outlet of the damper is connected to the at least one main supply air inlet in an air conducting manner and wherein a second outlet of the damper is connected to the at least one assisting supply air inlet in an air conducting manner, wherein the damper is configured to distribute air entering its inlet between its first and second outlet.

6. The air conditioning system according to claim 1, further comprising at least one fresh air intake which opens to an outside of the room, wherein the fresh air intake is connected to the at least one main supply air inlet and/or to the at least one assisting supply air inlet in an air conducting manner.

7. The air conditioning system according to claim 1, wherein the at least one air outlet is an exhaust outlet, wherein the air conditioning system further comprises an exhaust blower connected to the at least one exhaust outlet and configured to blow air entering the blower from the exhaust outlet to an outside of the room.

8. The air conditioning system according to claim 1, further comprising a plurality of main supply air inlets which open into the room and are arranged at a height of ≤0.3 m above the floor of the room, or on the floor of the room,
wherein a first fraction of said main supply air inlets is arranged at a first sidewall of the room and a second fraction of said main supply air inlets is arranged at a second sidewall opposing the first sidewall.

9. The air conditioning system according to claim 8, further comprising a main supply damper, wherein an inlet of the main supply damper is connected to an air conditioner and/or to a fresh air intake in an air conducting manner, wherein a first outlet of the main supply damper is connected to at least one of the main supply air inlets of the first fraction and a second outlet of the main supply damper is connected to at least one of the main supply air inlets of the second fraction in an air conducting manner, wherein the main supply damper is configured to regulate an amount of air flowing to at least one of the main supply air inlets of the first fraction and to at least one of the main supply air inlets of the second fraction.

10. The air conditioning system according to claim 1, wherein the system comprises a plurality of assisting supply air inlets which open into the room and are arranged at a height between a first point of the seat and a second point of the seat, wherein one fraction of said assisting supply air inlets is arranged at a first sidewall of the room and another fraction of said assisting supply air inlets is arranged at a second sidewall of the room opposing the first sidewall.

11. The air conditioning system according to claim 10, further comprising an assisting supply damper, wherein an inlet of the assisting supply damper is connected to an air conditioner and/or to a fresh air intake in an air conducting manner, wherein a first outlet of the assisting supply damper is connected to at least one of the assisting supply air inlets of the first fraction and a second outlet of the assisting supply damper is connected to at least one of the assisting supply air inlets of the second fraction in an air conducting manner, wherein the assisting supply damper is configured to regulate an amount of air flowing to at least one of the assisting supply air inlets of the first fraction and to at least one of the assisting supply air inlets of the second fraction.

12. The air conditioning system according to claim 1, wherein the system comprises a controller configured to control that the air blown into the room through the
i) at least one assisting supply air inlet has a lower volume flow than air blown into the room through the at least main supply air inlet of the volume flow of the air blown into the room through the at least one main supply air inlet; and/or
ii) at least one main supply air inlet has a higher temperature than the air blown into the room through the at least one assisting supply air inlet.

13. The air conditioning system according to claim 1, wherein the room is a carriage of a train.

14. The air conditioning system according to claim 2, wherein the height between the first point of the seat and the second point of the seat is a height ranging from ≥0.5 m above the floor of the room to ≥0.8 m below the ceiling of the room.

15. The air conditioning system according to claim 2, wherein the height between the first point of the seat and the second point of the seat is a height ranging from ≥0.5 m above the floor of the room to ≥1.1 m below the ceiling of the room.

16. The air conditioning system according to claim 2, wherein the height between the first point of the seat and the second point of the seat is in a range of 0.5 m to 1.4 m from the floor of the room.

17. The air conditioning system according to claim 6, wherein the fresh air intake is connected to the at least one main supply air inlet and/or to the at least one assisting supply air inlet via an air intake blower.

18. The air conditioning system according to claim 12, wherein the at least one assisting supply air inlet has a volume flow of 67% of the air blown into the room through the at least main supply air inlet, and the at least one main supply air inlet has a temperature that is 6 K higher than the temperature of the air blown into the room through the at least one assisting supply air inlet.

19. The air conditioning system according to claim 12, wherein the at least one assisting supply air inlet has a volume flow between 40% and 80% of the air blown into the room through the at least main supply air inlet, and the at least one main supply air inlet has a temperature that is 1 K to 12 K higher than the temperature of the air blown into the room through the at least one assisting supply air inlet.

20. A method for air conditioning a room which comprises at least one seat,
blowing air into the room through at least one main supply air inlet which opens into the room and is arranged at a height of ≤0.3 m above a floor of the room, or on a floor of the room,
removing air from the room through at least one air outlet which opens into the room and is arranged at a distance of <0.3 m below a ceiling of the room, or in a ceiling of the room, and
additionally blowing air into the room through at least one assisting supply air inlet which opens into the room and is arranged at a height between a first point of the seat and a second point of the seat,
wherein the first point of the seat has a largest distance to the floor of the room in a direction perpendicular to the floor of the room and the second point of the seat is a point of an armrest of the seat which has a largest distance to the floor of the room in the direction perpendicular to the floor of the room, and
wherein air temperature and air flow through the at least one main supply air inlet and the at least one assisting supply air inlet are independently controlled.

* * * * *